July 5, 1932.   H. MANRODT   1,866,119
ROTARY VALVE COMBUSTION ENGINE
Filed May 15, 1929   2 Sheets-Sheet 2
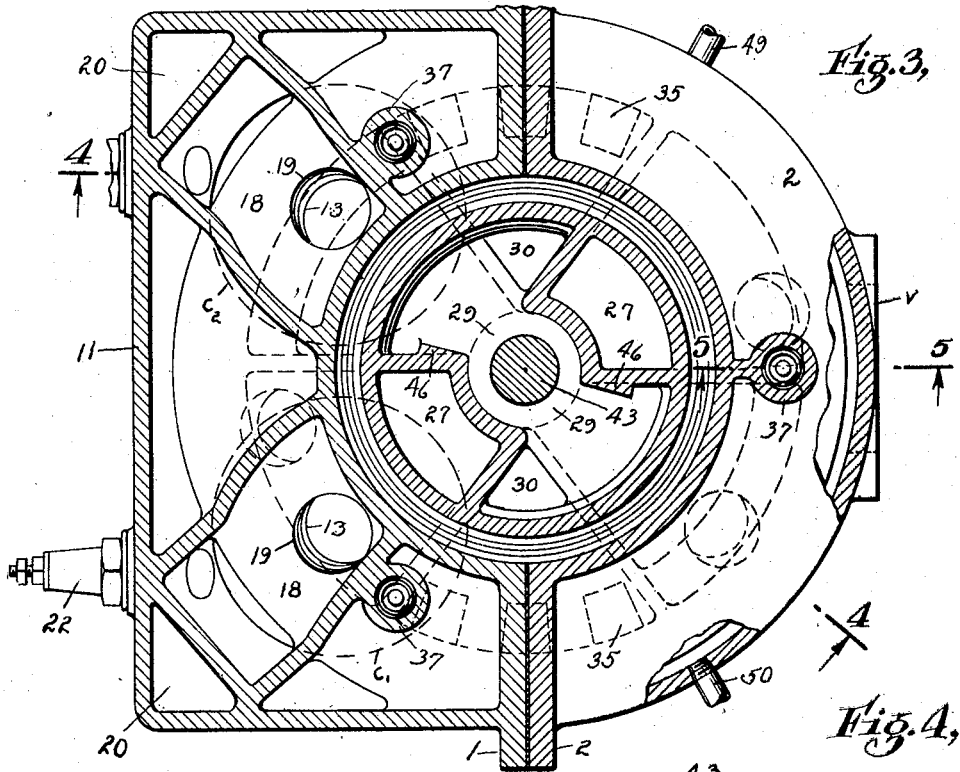
Fig. 3.
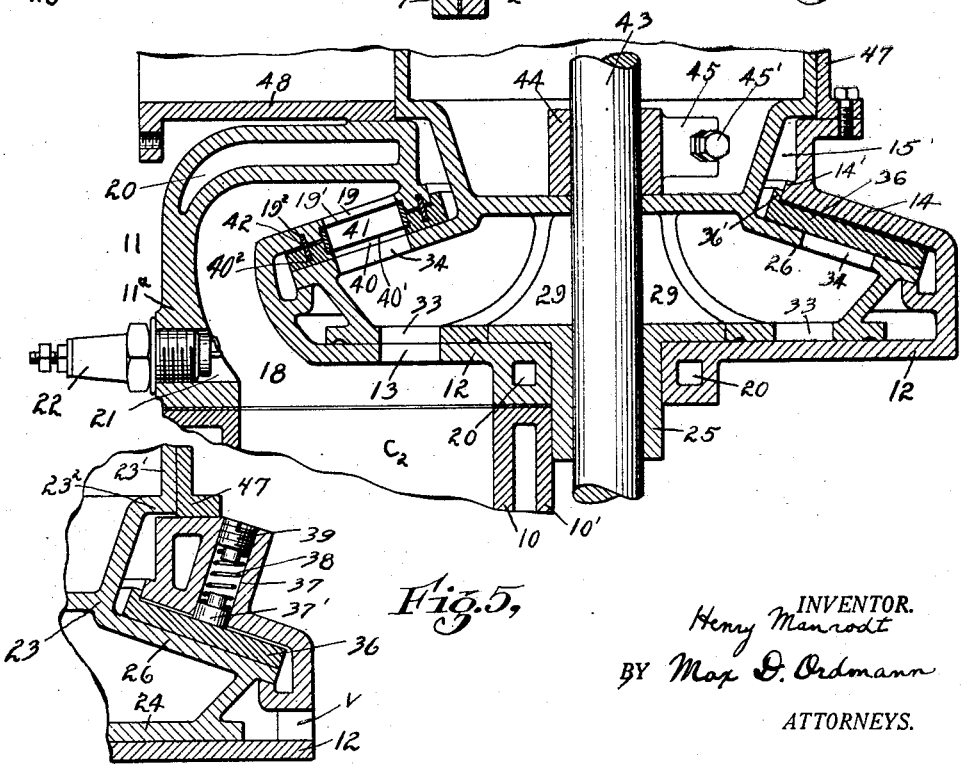
Fig. 4.
Fig. 5.
INVENTOR.
Henry Manrodt
BY Max D. Ordmann
ATTORNEYS.

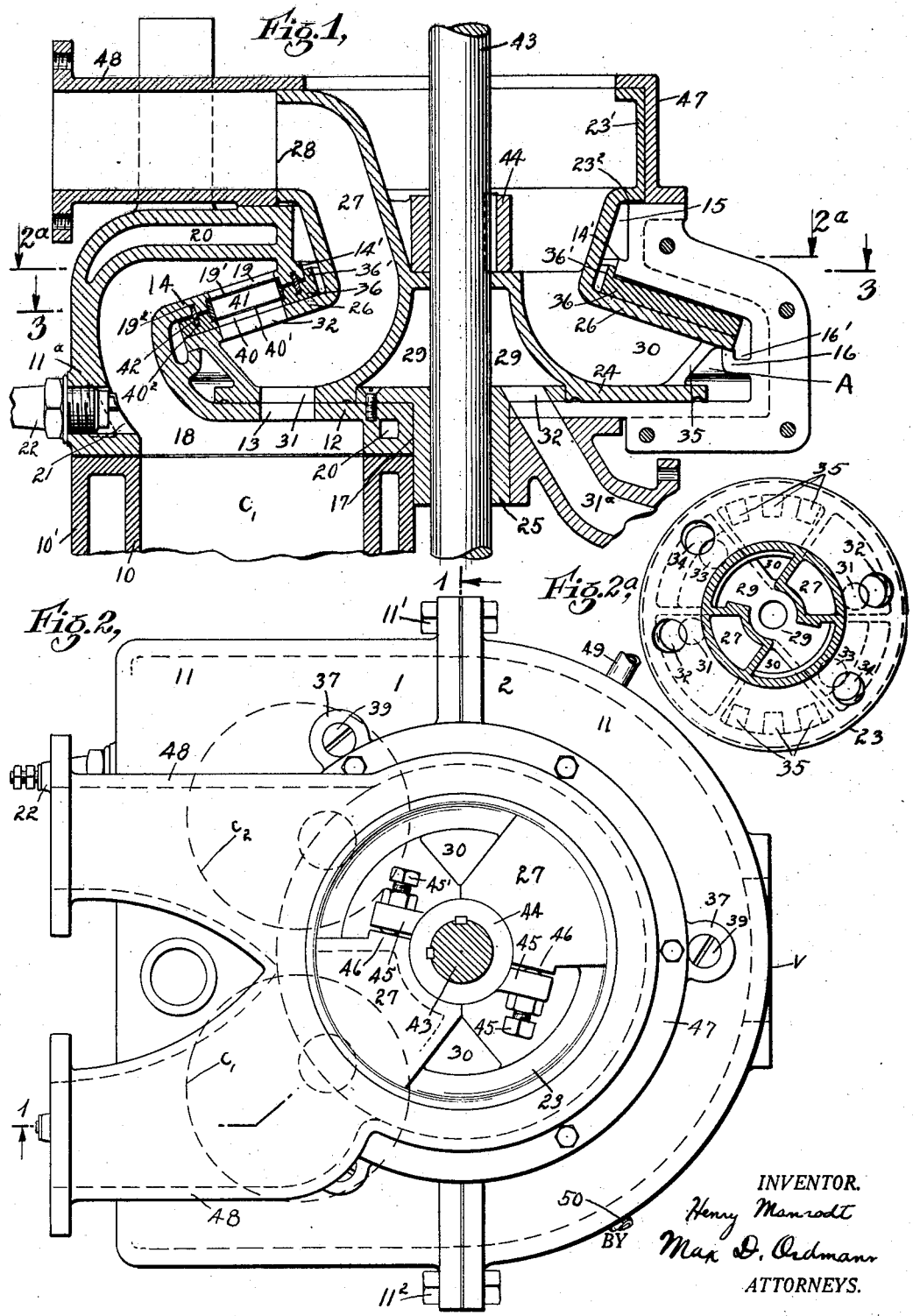

Patented July 5, 1932

1,866,119

UNITED STATES PATENT OFFICE

HENRY MANRODT, OF NEWARK, NEW JERSEY

ROTARY VALVE COMBUSTION ENGINE

Application filed May 15, 1929. Serial No. 363,136.

The present invention relates to internal combustion engines and has for its primary object the provision of a balanced rotary valve which will replace the common inlet and exhaust valves now used and serve to control the cyclic operations in the cylinders of such an engine.

Another object is to provide a single valve structure which may operate in conjunction with and as common control for a plurality of the cylinders.

A further object is to provide a valve and cylinder head construction whereby expansion of said valve during operation will be compensated for without impairing the effectiveness of the valve seal.

Still another object is to provide means whereby the valve will be air cooled.

Another object is to provide a valve structure whereby the relative proportions of the inflowing fuel and air mixture from the carburetor to the cylinders will be unchanged by passage through the said valve.

With the above and other objects in view, my invention consists in the novel construction, combination and arrangement of parts as will hereinafter be described and shown in the accompanying drawings which form part of this specification.

In the drawings wherein similar reference characters denote corresponding parts:

Fig. 1 is a vertical section taken along line 1—1 of Fig. 2 in the direction of the arrows;

Fig. 2 is a top plan view of the cylinder head and valve in position of use over the cylinders of a combustion engine;

Fig. 2ª is a reduced full section of my valve along line 2a—2a of Fig. 1;

Fig. 3 is a section along line 3—3 of Fig. 1 seen in the direction of the arrows;

Fig. 4 is a section along line 4—4 of Fig. 3 also seen in the direction of the arrows; and Fig. 5 is a sectional detail along line 5—5 of Fig. 3 in the direction of the arrows.

In the present embodiment of my invention for the purpose of illustration I show a valve structure adapted to cooperate with two cylinders of an engine and also the corresponding cylinder head construction therefor. The valve however is not limited to cooperate with only two cylinders but may be modified without the exercise of invention to cooperate with any number of suitably arranged cylinders.

Referring now to the drawings, $c'$, $c^2$ represent the two cylinder bores in a common cylinder block 10 having the usual water jacket 10'. The structure of the cylinder block is usual and forms no part of the present invention.

Mounted on said cylinder block 10 in suitable manner is my novel cylinder head 11. The said head is provided with an interior valve chamber A. The bottom wall 12 of said chamber may be formed as a horizontal valve seat and has a suitable port 13 over each of said cylinders, $c'$ and $c^2$, each port serving both as inlet and exhaust port for the respective cylinders during the respective strokes of the cycle. The top wall 14 of said chamber may be formed at an angle with the horizontal for a purpose hereinafter specified. An enlarged opening 15 communicating with said chamber A is provided in the top of said head 11 and the top wall 14 projects into said opening to form an annular shoulder 14' therein. An annular shoulder 16 is formed in the side wall of said chamber A and has an annular groove 16' therein in which excess oil may collect. An opening 17 concentric with the top opening 15 is provided in the bottom 12 of said head.

Over each cylinder bore $c'$ and $c^2$ in the block 10 I provide a combustion chamber 18 in the head 11, each of said chambers being entirely separate from the chamber A, independent of one another and each communicating directly with its respective cylinder. The hollowed portions of said chambers 18 extend above the inner top wall 14 and suitable ports 19 are provided in said top wall each communicating with the said chamber 18 and having areas such that the vertical pressure through said ports during the compression and explosion strokes will be equal to and counter to the pressure through the ports 13.

A suitable water jacket formed by arranging water circulating ducts 20 in the walls of said head is provided for cooling the latter.

Openings 21 are formed in the side walls 11ª of the head one communicating with each of said compression chambers 18 and into which spark plugs 22 are adapted to be inserted. The head 11 is preferably in two sections 1 and 2 which are adapted to be suitably bolted together as at 11' and 11², the said head being so formed in order to permit the insertion of the valve to be hereinafter described. There are air ducts $v$ through the side walls of said head and communicating with said valve chamber A below said shoulder 16.

The rotary valve 23 which is designed to control the cyclic operations in the said cylinders and which operates in the valve chamber A has a flat base 24 which is designed to ride on the valve seat 12, the said valve being centered on said base by means of a bearing 25 fixedly mounted in the opening 17 in said head 11. A portion 26 of the outer wall of said valve body may be slantingly formed to correspond to the slanting wall portion 14 of the head 11 but is arranged so as to leave a space between it and the said wall. The valve extends upwardly through the opening 15 in said head and terminates in a cylindrical portion 23' just above the top of said head 11 but so dimensioned that the lower shoulder 23² of said portion does not contact with the top of said head 11.

The interior of the valve is arranged with exhaust chambers 27, a fuel inlet chamber 29 and air cooling chambers 30. Each of the exhaust chambers 27 is provided with a port 31 in the bottom wall 24 of said valve and a port 32 in the slanting wall 26 of the said valve. Similar ports 33 and 34 are provided which communicate with the fuel inlet chamber 29. The angular arrangement of the said inlet and exhaust ports about the surfaces of said walls 24 and 26 is such that the ports will cooperate with the respective ports in the head 11 at the proper periods during the strokes of the pistons of said engine.

The fuel inlet chamber 29, into which the fuel from the carburetor lead 31ª is admitted through a suitable opening 32 in head 11 and bearing 25, has a volume approximately equal to the volume of said lead 31ª whereby the fuel mixture will retain its proportionate air and gas content up to the time of its entry into the cylinders 10. The said chamber also has highly polished inner walls as it has been found that by so polishing the walls the retention of constancy of the fuel mixture is aided. Furthermore, the passageways from said chamber 29 to the ports 33 and 34 leading therefrom to the cylinders are such that the gases may be centrifugally led directly to said ports in the shortest possible path during operation.

The air chambers 30 which communicate with the outer atmosphere through the top of said valve, which is open, are adapted to circulate air through the inner parts of the valve about the walls of the said other chambers and are provided with suitable ports 35 in the side walls of said valve which permit air to be drawn through said valve and said ports and through the ports $v$ in the head 11 whereby the air so drawn may be led to the carburetor by suitable means (not shown) and be used for mixture with the fuel. The direction of air flow may be reversed if desired.

Of course during the compression and explosion strokes of the cycle of each cylinder it is necessary that the respective ports in the head 11 be sealed. This could be accomplished by making the valve walls 24 and 26 fit tightly between the walls 12 and 14 of said head. However, because of the fact that the valve expands during operation its operation would be impaired. It is to eliminate this difficulty that I have so dimensioned my valve as to leave a space between the wall 14 of the head and wall 26 of the valve. Designed to fit in this space with a small clearance sufficiently great to prevent "freezing" of the valve in said chamber even at its hottest operating temperature, is an annular ring 36 which is centered by having a laterally projecting shoulder 36' which may rest against the shoulder 14' in said head. The said ring is displaceably borne in said space but is prevented from rotating by means of suitably spaced pins 37' mounted thereon and which are adapted to project into suitable openings 37 formed in the head 11 and to be slidable therein. Means are also provided in said openings 37 for continuously urging said ring against said valve and for instance may comprise a compression spring 38 carried in each of said openings and adapted to be adjustably compressed therein by means of a threaded plug 39. Ports 40 registering and corresponding exactly in dimensions with the ports 19 are cut in the said ring. Now then, in order to prevent the escape of gases between the wall 14 and the top face of said ring at said port openings I provide cut away portions 19' and 40' in the walls of the said ports 19 and 40 into which I may insert a split packing ring 41 of sufficient width to seal the clearance passageway and at the same time be sufficiently narrower than the total width of said cut away portions as to permit the necessary displacement of said ring 36 during the expansion of said valve. If desired additional rings 42 similar in kind to ring 41 may be set into corresponding grooves 40² and 19² in said ring 36 and head 11 respectively. The annular ring need not only be arranged between the surfaces 14 and 26 but if desired a second ring having the same characteristics and functions may be mounted between the surfaces 12 and 24 and the valve dimensions adjusted accordingly. The ring 36 may be displaceably mounted on said valve instead of said head if desired.

My valve is driven by means of a shaft 43 which passes through a central opening in said valve and is rotatably borne in bearing 25 and is connected with suitable driving means (not shown). The said shaft may also freely rotate in said valve. In order to communicate its rotation to the said valve I provide a collar 44 which is adapted to be keyed to said shaft and which is formed with laterally extending wings 45. The said wings are each provided with an adjusting bolt or screw 45′ threadedly engaged in openings therein, said bolts being adapted to bear on respective abutment ledges 46 suitably provided on the outer walls of the exhaust chambers 27 of said valve. It is therefore possible by the above described drive to adjust the relative position of the valve and shaft 43 in order to insure the proper timing arrangement of the valve ports and the cylinder head ports. It is immaterial whether the said collar is positioned above the valve or below it of course, but convenience and accessibility make it preferable to arrange it as shown.

In order to lead off the exhaust gases which emerge from the exhaust chambers 27 through openings 28 in the side walls of the cylindrical portion 23′ of said valves, an exhaust head 47 adapted to be suitably mounted on said head 11 is provided and is arranged with a portion in which said cylindrical upper part 23′ of the valve may freely rotate. Suitable exhaust leads 48 which are adapted to be connected to an exhaust pipe (not shown) of said engine are arranged in said exhaust head and so located that the proper openings 28 will register with said leads 48 when the respective exhaust stroke of a corresponding cylinder is taking place. No supporting engagement exists between said exhaust head and said valve.

It is to be understood that the cooperating surfaces of said valve head and annular expansion compensating ring are finely ground valve surfaces. Suitable oil inlets 49 and 50 entering through said head 11 are provided for forming the desired oil film seal between the surfaces 12 and 24 and between the lower surface of said annular ring 36 and said valve surface 26. The excess oil between said two last named surfaces collects in the groove 16′ whence it may be led off in any suitable manner.

My device operates as follows:

When the motor is turned over in usual manner, the valve is caused to rotate by the means described. At the proper position of the piston for intake the proper ports 33 and 34 begin to register with the cylinder ports 13 and 19 and complete the intake period in the required time interval. Said ports 13 and 19 then are sealed by the valve surfaces 24 and 26 and remain so during the compression and explosion strokes. Then again at the proper time interval the proper exhaust ports 31 and 32 cooperate with said ports 13 and 19 and permit the exhaust to be led away through the corresponding exhaust chamber 27, to the exhaust leads 48. The cycle then repeats itself and the mode of operation is the same for each cylinder.

During operation air is drawn in through the chambers 30 and cools the valve and likewise the flow of fuel through chamber 29 also tends to cool said valve.

My device may be modified in many ways and in its structural details without departing from the spirit of the invention involved and I do not wish to be limited to the details shown and described.

What I claim is:

1. In an internal combustion engine having a valve chamber, a rotary valve for controlling the cyclic operations in the cylinders of said engine, means for balancing said valve, and means for compensating the expansion thereof during operation of said engine, said last named means including an annular member concentrically arranged with respect to the axis of said valve and adapted to be mounted between said valve and the walls of said valve chamber.

2. In an internal combustion engine, a cylinder head therefor provided with an internal valve chamber, a rotary valve for controlling the cyclic operations in the cylinders of said engine, means in said head for balancing said valve and means for compensating for the expansion of said valve during operation of said engine, said last named means including an annular member adapted to be non-rotatively mounted between said valve and said head and means continuously urging said member against said valve.

3. In an internal combustion engine, a stationary cylinder head adapted to be mounted over the cylinder block of said engine and provided with a valve chamber, a separate combustion chamber above each of the cylinders in said block, each of said combustion chambers being provided with ports communicating with said valve chamber, said ports functioning both as the intake and exhaust ports, a rotary valve in said cylinder head provided with independent fuel inlet and exhaust chambers having ports adapted to cooperate with the port in said head during certain periods of the rotation of said valve, means for compensating for expansion and contraction of said valve during operation in said head, said last named means including an annular member adapted to be resiliently mounted between said valve and said head, and adjustable means for operating said valve.

4. In an internal combustion engine, a cylinder head therefor provided with an internal valve chamber, a rotary valve for controlling the cyclic operations in the cylinders of said engine, means in said head for balancing said valve and means for compensating for the expansion of said valve during operation of said engine, said means including an annular member concentrically arranged with respect to the valve axis and adapted to be mounted between walls of said valve chamber and said valve.

5. In an internal combustion engine, a cylinder head therefor provided with an internal valve chamber, having a slanting upper wall and a central top opening, a rotary valve mounted in said chamber for controlling the cyclic operations in a plurality of the cylinders of said engine means in said valve for permitting fuel intake to said cylinders during certain periods of rotation of said valve, means in said valve for leading off the exhaust from said cylinders during other periods of its rotation, means for balancing the pressure on said valve during the compression and explosion strokes in said cylinders, and means mounted between said valve and said head for compensating for the expansion of said valve during operation, said last named means including an annular member concentrically arranged with respect to the valve axis and means for continuously urging said annular member against said valve.

6. In an internal combustion engine, a cylinder head therefor provided with an internal valve chamber, a rotary valve mounted in said chamber for controlling the cyclic operations in a plurality of the cylinders of said engine, means in said valve for permitting fuel intake to said cylinders during certain periods of its rotation, means in said valve for leading off the exhaust from said cylinders during other periods of its rotation, means for balancing the pressure on said valve during the explosion and compression strokes in said cylinders and means mounted between said head and said valve for compensating for the expansion of said valve during operation, said compensating means including an annular member adapted to be non-rotatively mounted between said valve and said head and means continuously urging said member against said valve.

7. In a device as per claim 8, in which said means for balancing the pressure on said valve during the explosion and compression strokes of said cylinders includes a separate combustion chamber over each of said cylinders provided with ports one in the bottom wall and one in the top wall of said valve chamber said ports having areas such that the vertical pressures exerted on the respective surfaces of said valve during said strokes are equal and opposite.

8. In an internal combustion engine, a cylinder head therefor, provided with an internal valve chamber, a rotary valve mounted in said chamber for controlling the cyclic operations in a plurality of cylinders of said engine, a fuel inlet chamber in said valve provided with ports adapted to periodically cooperate with ports in said cylinder head, means in said valve for leading off the exhaust from said cylinder during certain periods of its rotation, means for balancing the pressure on said valve during the exhaust and compression strokes in said cylinder and means for compensating for the expansion of said valve during operation, said compensating means including an annular member concentrically arranged with respect to the valve axis and adapted to be mounted between said valve and walls of the valve chamber.

9. In an internal combustion engine, a cylinder head therefor provided with an internal valve chamber, a rotary valve mounted in said chamber for controlling the cyclic operations in a plurality of the cylinders of said engine, a fuel inlet chamber in said valve having a volume equal to that of the inlet lead from the carburetor of said engine to said valve and being finished interiorly, means in said valve for leading off the exhaust from said cylinders during periods of rotation of said valve, and means in said valve for air cooling the latter.

10. In an internal combustion engine, a cylinder head therefor provided with an internal valve chamber having a slanting upper wall and a central top opening, a rotary valve mounted in said chamber for controlling the cyclic operation of the engine, means in said valve for permitting fuel intake to said cylinders during certain periods of rotation of said valve, means in said valve for leading off the exhaust from said cylinders during other periods of its rotation, means for balancing the pressure on said valve during the compression and explosion strokes in said cylinders, and means mounted between said valve and said head for compensating for the expansion of said valve during operation, said compensating means including an annular member concentrically arranged with respect to the valve axis and adapted to be mounted between said valve and walls of the valve chamber.

11. In an internal combustion engine, a cylinder head therefor provided with an internal valve chamber, a balanced rotary valve mounted in said chamber for controlling the cyclic operations of said engine, a fuel inlet chamber in said valve provided with ports adapted to cooperate with ports in said cylinder head, means in said valve for leading off the exhaust from said cylinder during certain periods of its rotation and means for compensating for the expansion of said valve during operation, said compensating means including an annular member concentrically arranged with respect to the valve axis and adapted to be mounted between said valve and walls of the valve chamber.

Signed at New York this 14th day of May 1929.

HENRY MANRODT.